(12) United States Patent
Hatanaka

(10) Patent No.: US 7,077,657 B2
(45) Date of Patent: Jul. 18, 2006

(54) CONTACT STRUCTURE FOR CONNECTOR ARRAY AND ELECTRONIC APPLIANCE HAVING THE SAME

(75) Inventor: Makoto Hatanaka, Handa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/073,565

(22) Filed: Mar. 8, 2005

(65) Prior Publication Data

US 2005/0202729 A1 Sep. 15, 2005

(30) Foreign Application Priority Data

Mar. 12, 2004 (JP) .............................. 2004-070060

(51) Int. Cl.
*H01R 12/00* (2006.01)
(52) U.S. Cl. ...................................................... 439/63
(58) Field of Classification Search .................. 439/63, 439/188, 581, 578, 75, 82, 944, 74, 700, 439/924.1, 824; 357/74

See application file for complete search history.

(56) References Cited

U.S. PATENT DOCUMENTS

| | | | | |
|---|---|---|---|---|
| 4,387,388 A | * | 6/1983 | Zakhariya | 257/697 |
| 4,734,046 A | * | 3/1988 | McAllister et al. | 439/101 |
| 5,174,763 A | * | 12/1992 | Wilson | 439/66 |
| 6,390,826 B1 | * | 5/2002 | Affolter et al. | 439/70 |
| 6,447,340 B1 | * | 9/2002 | Wu | 439/660 |
| 6,663,440 B1 | * | 12/2003 | Cox et al. | 439/700 |
| 6,789,415 B1 | | 9/2004 | Kaiser et al. | |
| 6,890,218 B1 | * | 5/2005 | Patwardhan et al. | 439/654 |

* cited by examiner

*Primary Examiner*—Tulsidas C. Patel
*Assistant Examiner*—Phuongchi Nguyen
(74) *Attorney, Agent, or Firm*—Posz Law Group, PLC

(57) ABSTRACT

A contact structure for electrically connecting a spring-loaded connector array and a pad array, the spring-loaded connector array having a plurality of spring-loaded connectors arranged in parallel with each other and the pad array having a plurality of pads arranged so as to come in contact with the plurality of connectors. A tip of a first connector of the plurality of spring-loaded connectors has an initial position that is axially offset from an initial position of a tip of a second connector of the plurality of spring-loaded connectors. A first pad of the plurality of pads that is arranged to come in contact with the first connector is axially offset from a second pad of the plurality of pads.

18 Claims, 7 Drawing Sheets

CONTACT STRUCTURE FOR CONNECTOR ARRAY AND ELECTRONIC APPLIANCE HAVING THE SAME

CROSS REFERENCE TO RELATED APPLICATION

This application is based upon and claims the benefit of priority of Japanese Patent Application No. 2004-070060 filed on Mar. 12, 2004, the content of which is incorporated herein by reference.

FIELD OF THE INVENTION

The present invention relates to a contact structure for electrically connecting a spring-loaded connector array and a pad array, and to an electronic appliance having the spring-loaded connector array and adapted to the contact structure.

BACKGROUND OF THE INVENTION

U.S. Pat. No. 6,789,415 (WO00/63665) discloses a pressure-sensing sensor having a pressure-sensing device and a spring-loaded connector array (a plurality of spring-loaded connectors) for outputting detection signals of the pressure-sensing device.

However, the conventional pressure sensor has the following issues when the spring-loaded connector array thereof is electrically connected to a pad array located on an attachment component. These issues will be described in the following with reference to FIGS. 7 and 8. FIG. 7 depicts structures of a conventional sensor appliance 800 and an attachment component 900 schematically. FIG. 8 depicts connection states of the sensor appliance 800 and the attachment component 900.

As shown in FIG. 7, the sensor appliance 800 is provided with a sensor frame having sensing devices a case 810 thereof. The sensor appliance 800 is also provided with a plurality of terminals 820 for outputting detection signals of the sensing devices in such a manner of projecting out of the case 810 in a same direction and in parallel. While, the attachment component 900 is provided with a plurality of pads 920 on its connection surface 910 facing the tips of the plurality of terminals 820 and arranged at corresponding positions to those of the plurality of terminals 820.

The terminals 820 have a common shape, and the tips of the terminals 820 are arranged at a generally uniform height relative to the attachment component 900 and symmetrically disposed with respect to a center axis of the case 810. Thus, the terminals 820 and the pads 920 can securely contact to each other even when the terminals 820 is shifted to some extent relative to the pads 920 of the attachment component 900.

Specifically, in FIG. 8, it is assumed that the sensor appliance 800 has four terminals 820 of V for power supply, O for output, G for grounding and C for control and that the attachment component 900 has four pads 920 of V, O, G and C.

When the terminals 820 and the pads 920 are at a regular position as shown in an uppermost figure in FIG. 8, the tips of each of the terminals 820 of V for power supply, O for output, G for grounding and C for control are respectively in contact with and electrically connected to the pads 920 of V for power supply, O for output, G for grounding and C.

However, as shown in a lowermost figure in FIG. 8, the terminals 820 and the pads 920 are erroneously assembled if the sensor appliance 800 is in a rotated angle of 90 degrees from the above regular position, for example. Even in this case, the terminals 820 and the pads 920 come in contact to each other because the terminals 820 have a common shape, and the tips of the terminals 820 are arranged at a generally uniform height relative to the attachment component 900. This erroneously assembly may cause a failure of an electric circuit formed between the sensor appliance 800 and the attachment component 900 that are electrically connected at all contact points when electricity flows therein without noticing an error in the assembly.

SUMMARY OF THE INVENTION

An object of the present invention, in view of the above issues, is to provide a contact structure for electrically connecting a spring-loaded connector array having a plurality of spring-loaded connectors and a pad array having a plurality of pads that can prevent erroneous assembly of the spring-loaded connector array and the pad array.

In one aspect of the present invention, an position of a tip of at least one connector of the plurality of spring-loaded connectors is ahead of an initial position of each of the other connector(s) of the plurality of spring-loaded connectors, and at least one pad that is aligned to come in contact with the at least one connector is located behind each of the other pad(s) of the plurality of pads.

In another aspect of the present invention, an initial position of a tip of at least one connector of the plurality of spring-loaded connectors is located behind an initial position of each of other connector(s) of the plurality of spring-loaded connectors, and at least one pad that is aligned to come in contact with the at least one connector is located ahead of each of the other pad(s) of the plurality of pads.

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
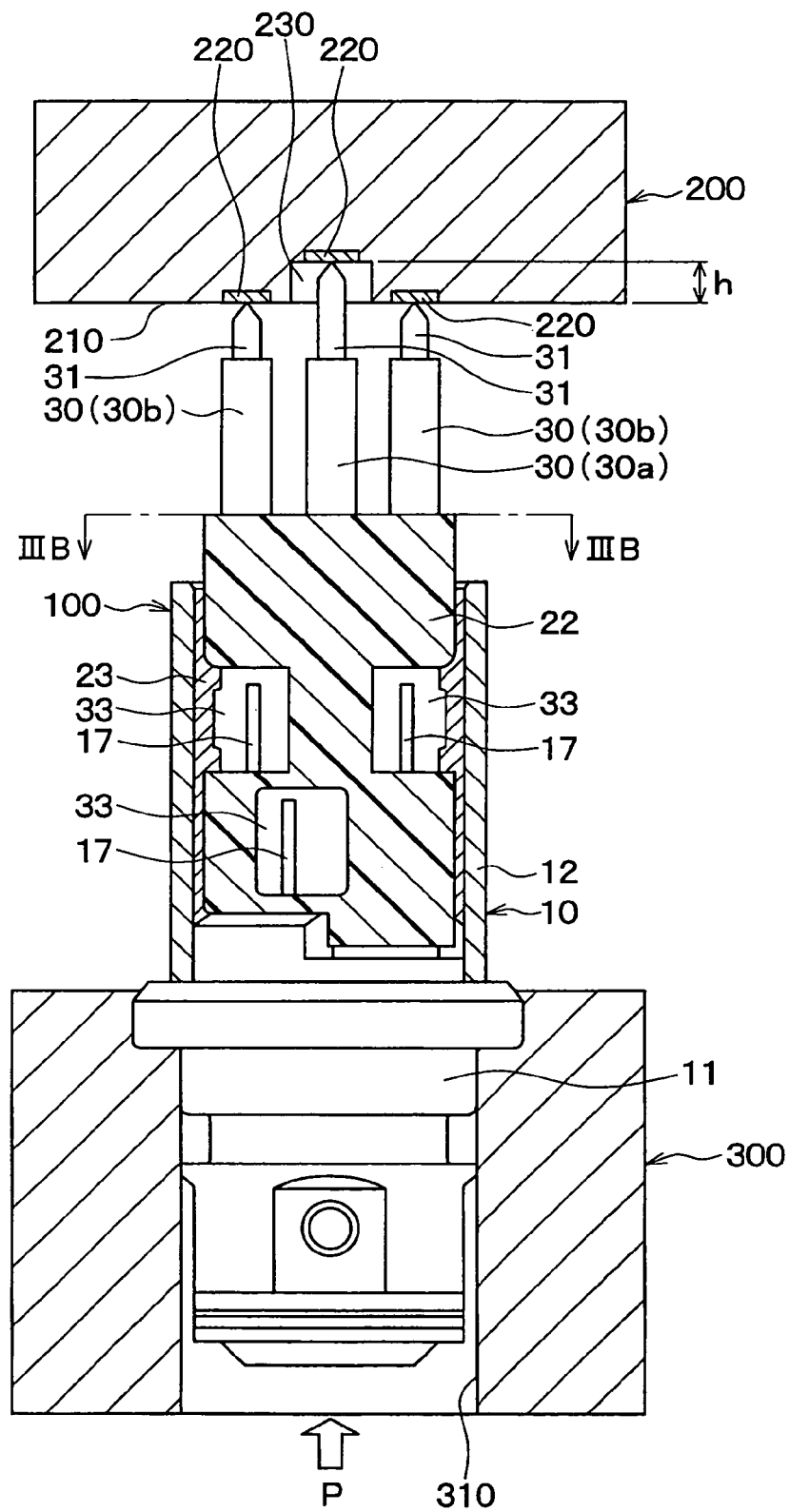
FIG. 1 is a cross-sectional view showing a principal portion of a contact structure of a sensor appliance and an attachment component according to a first embodiment of the present invention.

A sensor appliance ("electronic appliance" in the present invention) 100 of a first embodiment, which is shown in FIG. 1, is adopted as a pressure sensor for detecting a pressure of brake fluid and located on an actuator for vehicular braking system.

The sensor appliance 100 is provided with a sensor frame 11 having a pressure-sensing device 20 and a plurality of terminals 30 for outputting detection signals of the pressure-sensing device 20 and protruding out of the sensor frame 11 in parallel. A case 10 has a stepped cylindrical shape and is made of a metallic material for example. One end portion (a lower part in FIG. 1) of the case 10 encloses the sensor frame 11 locating the pressure-sensing device 20 therein. Another end portion (an upper part in FIG. 1) of the case 10 forms a pipe portion 12.

Figure 2:
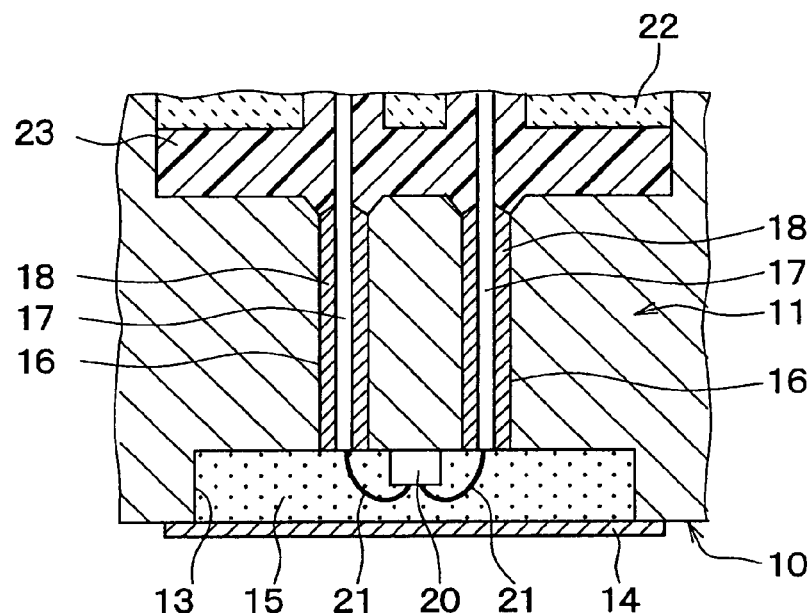
FIG. 2 is a cross-sectional view focusing on a sensor device of the sensor appliance shown in FIG. 1.

As shown in FIG. 2, the sensor frame 11 has a concavity 13 at a lower side that is opposite to the case 10 and contains the pressure-sensing device 20 therein. The pressure-sensing device 20 may include a semiconductor diaphragm, which generates an electric signal at a magnitude in accordance with that of applied pressure. The concavity 13 is closed by a metallic diaphragm 14 made of stainless steel and is fixed on the case 10 by welding or similar means. The concavity 13 encloses oil 15 such as fluorine oil as a pressure transmission medium. The oil 15 transmits the pressure applied on the metallic diaphragm 14, then the pressure-sensing device 20 outputs a signal according to the magnitude of the pressure.

The case 10 has through holes 16 at the bottom part of the pipe portion 12 in such a manner of communicating with the pressure-sensing device 20, which is disposed in the sensor frame 11. Metallic lead pins 17 are inserted in the through holes 16 from a side of the pipe portion 12 in the case 10. The lead pins 17 penetrate the case 10 through the through holes 16 so as to expose one end thereof in the concavity 13. In the through holes 16, clearances between the case 10 and the lead pins 17 are filled with glass material 18 as a hermetic insulator. The glass material 17 electrically insulates the case 10 from the lead pins 17.

The number of lead pins 17 is more than two and two of them are illustrated in FIG. 2. The sensor appliance 100 of the first embodiment has three lead pins 17 including one for electric supply, one for output, and one for grounding of the pressure sensor. FIG. 1 illustrates the three lead pins 17 extending out of the through holes 16 into the pipe portion 12.

Side ends of the lead pins 17 that are exposed in the concavity 17 are electrically connected to the pressure-sensing device 20 by bonding wires 21 such as gold wires and aluminum wires. As shown in FIG. 1, side ends of the lead pins 17 that are extending into the pipe portion 12 of the case 10 are electrically and mechanically connected to fixed pieces 33 of the terminals 30 that are made of conducting material such as metal, by welding, swaging, or bonding with a conductive adhesive such as a solder.

As shown in FIG. 1, the fixed pieces 33 of the terminals 30 and the lead pins 17 are supported by a support member 22, which is a molded body made of a resin, etc. and enclosed in the pipe portion 12 of the case 10. As shown in FIGS. 1 and 2, the structure also includes a coating material 23 made of resin such as epoxy resin and silicone.

Figure 3A:
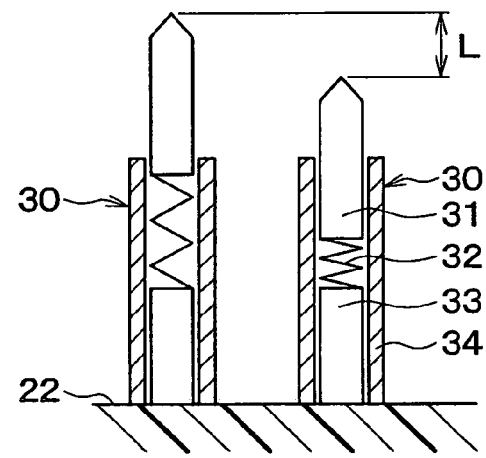
FIG. 3A is a cross-sectional view showing a detailed composition of a plurality of terminals of the sensor appliance shown in FIG. 1.
Figure 3B:
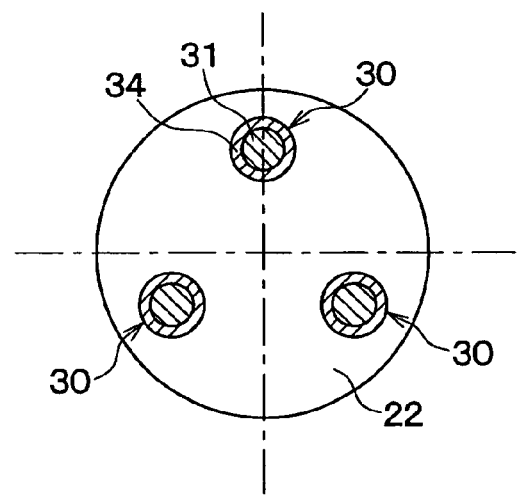
FIG. 3B is a cross-sectional view taken through line IIIB—IIIB in FIG. 1.

Each of the terminals 30 corresponds to each of the lead pins 17. In the first embodiment, three terminals 30 are provided for the pressure sensor. The fixed pieces 33 of the terminals 30 are electrically connected to the lead pins 17 in the pipe portion 12. These three terminals 30 are disposed in an upward direction (upward in FIG. 1) out of the sensor frame 11 and parallel to each other. The projecting portions of the terminals 30 extending out of the support member 22 have configurations as shown in FIGS. 3A and 3B. End portions of the fixed pieces 33 extend out of the support member 22. In the first embodiment, as shown in FIG. 3B, the three terminals 30 are symmetrically disposed around a center axis of the support member 22.

As shown in FIG. 3A, pipe-shaped casings 34, which are made of resins, metals or ceramics, enclose parts of the fixed piece 33 protruding out of the support member 22. The support member 22 fixes these casings 34. In each of the casings 34, a spring 32 made from an elastic body connects a tip piece ("moving piece" in the present invention) 31 and the fixed piece 33 of the terminal 30. The tip piece 31 is a bar made of conductive materials such as metals including gold plating. Thus, an elastic deformation of the spring 32 moves the tip piece 31, which is a tip portion of the terminal 30, back and forth in a longitudinal direction of the casing 34. That is, each terminal 30 has a fixed piece 33 at the side of sensor frame 11 and a tip piece 31 at the tip thereof, which is movable by the displacement of the spring 32 connecting the moving piece 31 and the fixed piece 33.

Specifically, the tip piece 31 moves between a state in which the spring 32 is not deformed as shown on the left side of FIG. 3A and a state in which the spring 32 is compressed as shown on the right side of FIG. 3A. Thus, the tip piece 31 moves with a stroke L shown in FIG. 3A.

As shown in FIG. 1, The sensor appliance 100 assembled as described above is fixed to an actuator housing 300 of the actuator for a vehicular braking system by swaging or by press-fitting the sensor frame 11 thereto. The actuator housing 300 is made of a metallic material such as aluminum and stainless steel and provided with a through hole 310 in which the sensor frame 11 is inserted. The sensor frame 11 receives pressure from brake fluid in a direction shown with arrow P in FIG. 1.

The sensor appliance 100 is electrically connected to the attachment component 200 as shown in FIG. 1. The attachment component 200 is made of metals, resins, ceramics and so on, though the material for forming the attachment component 200 is not especially limited. The attachment component 200 is configured as an actuator case enclosing electrical circuits (not shown) for receiving the outputs of the sensor appliance 100.

The attachment component 200 has pads 220 on a connecting surface 210 that faces the tip pieces 31 of the terminals 30. The pads 320 are disposed at positions corresponding to those of the terminals 30.

The pads 220 are made of conductive materials such as metals including gold plating. The sensor appliance 100 and the attachment component 200 is electrically connected when the tip portions 31 of the terminals 30 come in contact with the pads 220 corresponding thereto.

In the first embodiment, one terminal 30a has a tip piece 31 longer by a height h than those of the other terminals 30b. One pad 220 to be in contact with the terminal 30a is located in a concavity 230 having a depth h. Thus, the tip portions 31 of the terminals 30 including the long terminal 30a and short terminals 30b can come in electric contact with the pads 220 of the attachment component 200 securely.

Here, the stroke L of the tip pieces 31 of the terminals 30 is set to be shorter than the height h.

The sensor appliance 100 having the above configuration is mounted on the actuator for the braking system by fixing the sensor frame 11 onto the actuator housing 300 and by pushing the attachment component 200 onto the tip pieces 31 of the terminals 30 so that the terminals 30 come into electrical contact with the pads 220. The sensor frame 11 is disposed in brake fluid so as to measure a brake fluid pressure. The brake fluid pressure acts on the metallic diaphragm 14 and is transmitted via the oil 15 to the pressure-sensing device 20. Then the pressure-sensing device 20 sends an electric signal to the above-mentioned electrical circuits in the attachment component 200 via the bonding wires 21, lead pins 17, and terminals 30.

The sensor appliance 100 has three terminals 30 including one long terminal 30a and two short terminals 30b. The long terminal 30a is longer than each of the short terminals 30b by a height h. Further, as shown in FIG. 4B, one pad 220 for coming into contact with the long terminal 30a is located on a bottom surface of a concavity 230 offset by the same height h from the contact surface 210. Thus, the tip pieces 31 of the long terminal 30a and the short terminals 30b can come in electrically secure contact with the pads 220 only when the sensor appliance 100 and the attachment component 200 are assembled in correct orientations relative to each other.

When the sensor appliance 100 and the attachment component 200 are assembled in erroneous orientations relative to each other, some of the terminals 30 do not come in contact with the pads 220. This mechanism will be described in the following.

Figure 4A:
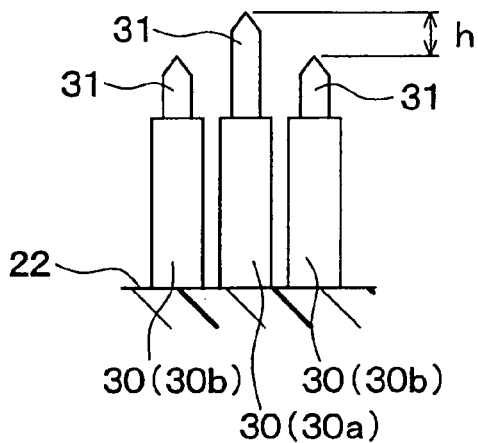
FIG. 4A is a side view showing the plurality of terminals according to the first embodiment.
Figure 4B:
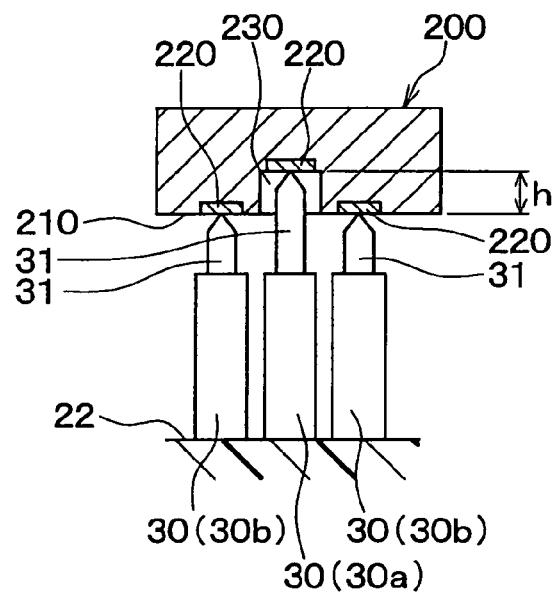
FIG. 4B is a side showing the plurality of terminals properly assembled with the attachment component according to the first embodiment.
Figure 4C:
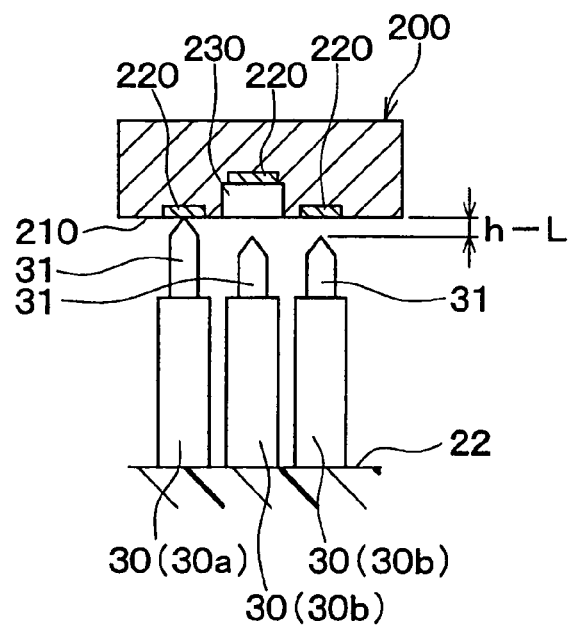
FIG. 4C is a side view showing the plurality of terminals improperly assembled with the attachment component according to the first embodiment.

FIGS. 4A to 4C depict the operation of the terminals 30. As shown in FIG. 4A, the tip position ("first tip position" in the present invention) of the long terminal 30a is higher than those ("second tip position") of the short terminals 30b in a longitudinal direction of the terminals 30 by the height h. When the sensor appliance 100 and the attachment component 200 are assembled in correct orientations relative to each other as shown in FIG. 4B, the tip piece 31 of the long terminal 30a and the short terminals 30b come in electrically secure contact with the pads 220.

When the sensor appliance 100 and the attachment component 200 are assembled in erroneous orientations relative to each other as shown in FIG. 4C, the tip piece 31 of the long terminal 30a come in contact with the pad 220 on the contact surface 210 retracting into the casing 34 by the stroke L. However, the tip pieces 31 of the short terminals 30b do not reach the pads 220 on the contact surface 210 and on the bottom surface of the concavity 230, thereby forming a clearance of (h–L) between the tip pieces 31 and the contact surface 210.

As described above, by the contact structure according to the first embodiment of the present invention, when the sensor appliance 100 and the attachment component 200 are erroneously assembled, some of the terminals 30 do not come in contact with the pads 220. Therefore, electric current does not flow properly between the sensor appliance 100 and the attachment component 200. This erroneous operation signals an erroneous assembly of the sensor appliance 100 and the attachment component 200.

Further, by setting the stroke L of the tip portions 31 shorter than the height h, the sensor appliance 100 and the attachment component 200, if erroneously assembled, generates the clearance of (h–L) at least therebetween, and increases the overall length of the sensor appliance 100 and the attachment component 200 by the clearance (h–L). This increased length also signals and erroneous assembly of the sensor appliance 100 and the attachment component 200.

Furthermore, by providing only one long terminal 30a among the terminals 30 and by providing only one concavity 230 locating the pad 220 on the bottom surface thereof, the erroneous assembly of the sensor appliance 100 and the attachment component 200 such as shown in FIG. 4C allows only one terminal 30 (the long terminal 30a) and pad 220 on the contact surface 210 to come into electric contact with each other. The electric contact of only one terminal 30 and pad 220 prevents the flow of electricity between the sensor appliance 100 and the attachment component 200, so as to prevent a fracture of the electric circuit caused by the erroneous assembly of the sensor appliance 100 and the attachment component 200.

Additionally, the sensor appliance 100 alone in the first embodiment also has the same advantages as those of the contact structure described above.

Figure 5A:
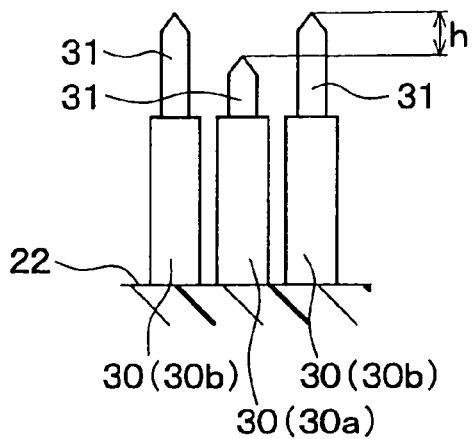
FIG. 5A is a side view showing a plurality of terminals in a sensor appliance according to a second embodiment of the present invention.
Figure 5B:
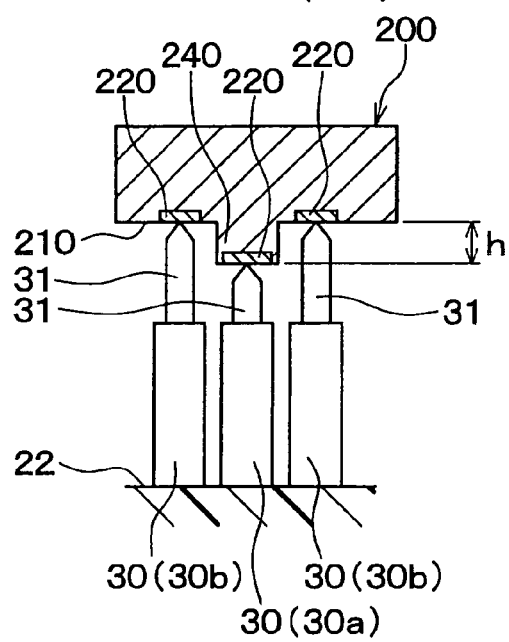
FIG. 5B is a side view showing the plurality of terminals properly assembled with an attachment component according to the second embodiment.
Figure 5C:
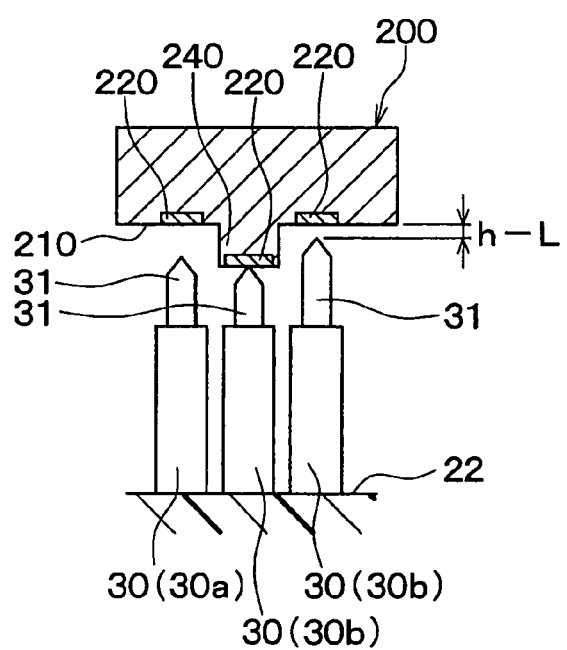
FIG. 5C is a side view showing the plurality of terminals improperly assembled with an attachment component according to the second embodiment.

FIGS. 5A to 5C depict a plurality of terminals 30 in a sensor appliance 100 according to a second embodiment. The following description focuses on different points relative to the first embodiment.

As shown in FIG. 5A, the sensor appliance 100 of the second embodiment has three terminals 30 including one short terminal 30a and two long terminals 30b. The short terminal 30a is shorter than each of the long terminals 30b by the height h. That is, the tip position ("first tip position" in the present invention) of the short terminal 30a is lower than those ("second tip position") of the long terminals 30b in a longitudinal direction of the terminals 30 by the height h. Further, as shown in FIG. 5B, one pad 220 for coming in contact with the short terminal 30a is located on a projection 240 protruding by the height h from the contact surface 210 of the attachment component 200. When the sensor appliance and the attachment component are assembled in correct orientations relative to each other, the tip pieces 31 of the short terminal 30a and the long terminals 30b can come in electrically secure contact with the pads 220.

When the sensor appliance 100 and the attachment component 200 are assembled in erroneous orientations relative to each other as shown in FIG. 5C, the tip piece 31 of one of the long terminals 30b (middle terminal 30 in FIG. 5C) come in contact with the pad 220 on the projection 240 and thereby retracting into the casing 34 by the stroke L. However, the tip pieces 31 of the short terminal 30a and another one of the long terminals 30b (rightmost terminal 30 in FIG. 5C) do not reach their corresponding pads 220 on the contact surface 210 and thus, a clearance of (h–L) is formed between the tip piece 31 of the rightmost long terminal 30b and the pad 220.

As described above, by the contact structure according to the second embodiment of the present invention, when the sensor appliance 100 and the attachment component 200 are erroneously assembled, some of the terminals 30 do not come in contact with the pads 220 so that electric current does not properly flow between the sensor appliance 100 and the attachment component 200. This erroneous operation signals the erroneous assembly of the sensor appliance 100 and the attachment component 200.

Further, also in the second embodiment, by setting the stroke L of the tip piece 31 of the terminals 30 (shown in FIG. 3A) shorter than the height h, the sensor appliance 100 and the attachment component 200, if erroneously assembled to each other, generate the clearance of (h−L) at least therebetween, and increases the overall length of the sensor appliance 100 and the attachment component 200 by the clearance (h−L). This increased length also signals the erroneous assembly of the sensor appliance 100 and the attachment component 200.

Furthermore, by providing only one short terminal 30a among the terminals 30 and by providing only one projection 240 locating the pad 200 on the top surface thereof, the erroneous assembly of the sensor appliance 100 and the attachment component 200 such as shown in FIG. 5C allows only one terminal 30 (the long terminal 30b) and pad 220 on the projection 240 to come into electrical contact with each other. The electrical contact of only one terminal 30 and pad 220 prevents the flow of electricity between the sensor appliance 100 and the attachment component 200, so as to prevent a fracture of the electric circuit caused by the erroneous assembly of the sensor appliance 100 and the attachment component 200.

Additionally, the sensor appliance 100 alone in the second embodiment also has the same advantages as those of the contact structure described above.

In the first and the second embodiments, one terminal 30a of the three terminals 30 is longer or shorter than the other two terminals 30b. Furthermore, the pad 220 that is to be in contact with the terminal 30a is disposed either in the concavity 230 or on the projection 240. Similarly, the sensor appliance having two or more than three terminals including only one terminal longer or shorter than the other terminal(s) has substantially the same advantages as those of the sensor appliance 100 in the first and the second embodiments.

Further, in the first and the second embodiments, one pad 220 to be in contact with the one terminal 30a is disposed in the concavity 230 or on the projection 240. Similarly, the contact structure of the attachment component having two or more than three pads 220 including one pad to be in contact with the one terminal 30a axially offset relative to the other pads and the above sensor appliance has substantially the same advantages as those of the contact structure in the first and the second embodiments.

Furthermore, in the first and the second embodiments, only one terminal 30a has a different length from those of the other terminals 30b. However, more than two terminals may have different length from those of the other terminals. Furthermore, all the terminals may have different lengths.

Figure 6:
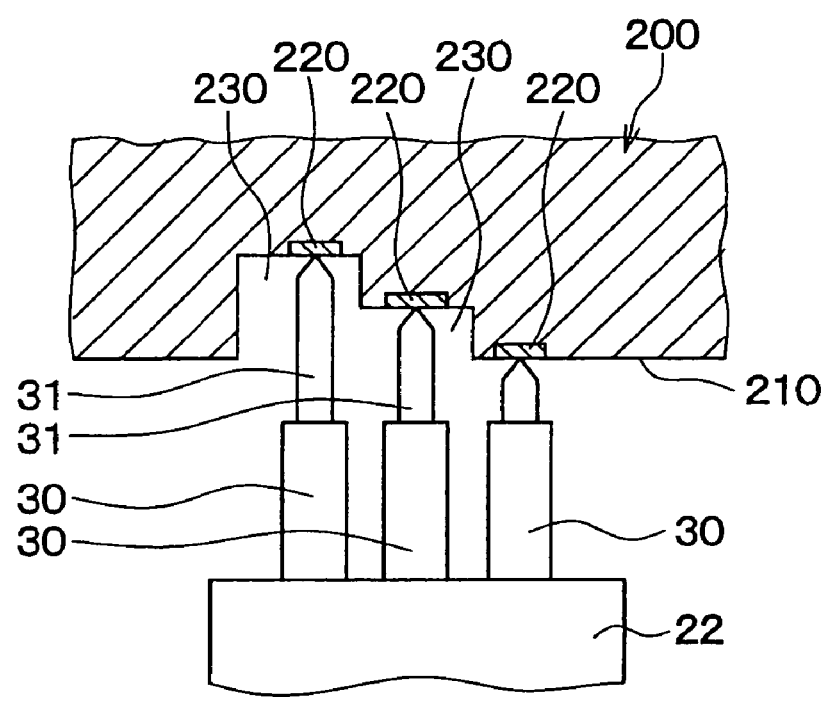
FIG. 6 is a side view showing a plurality of terminals assembled with an attachment component according to a third embodiment of the present invention.
Figure 7:
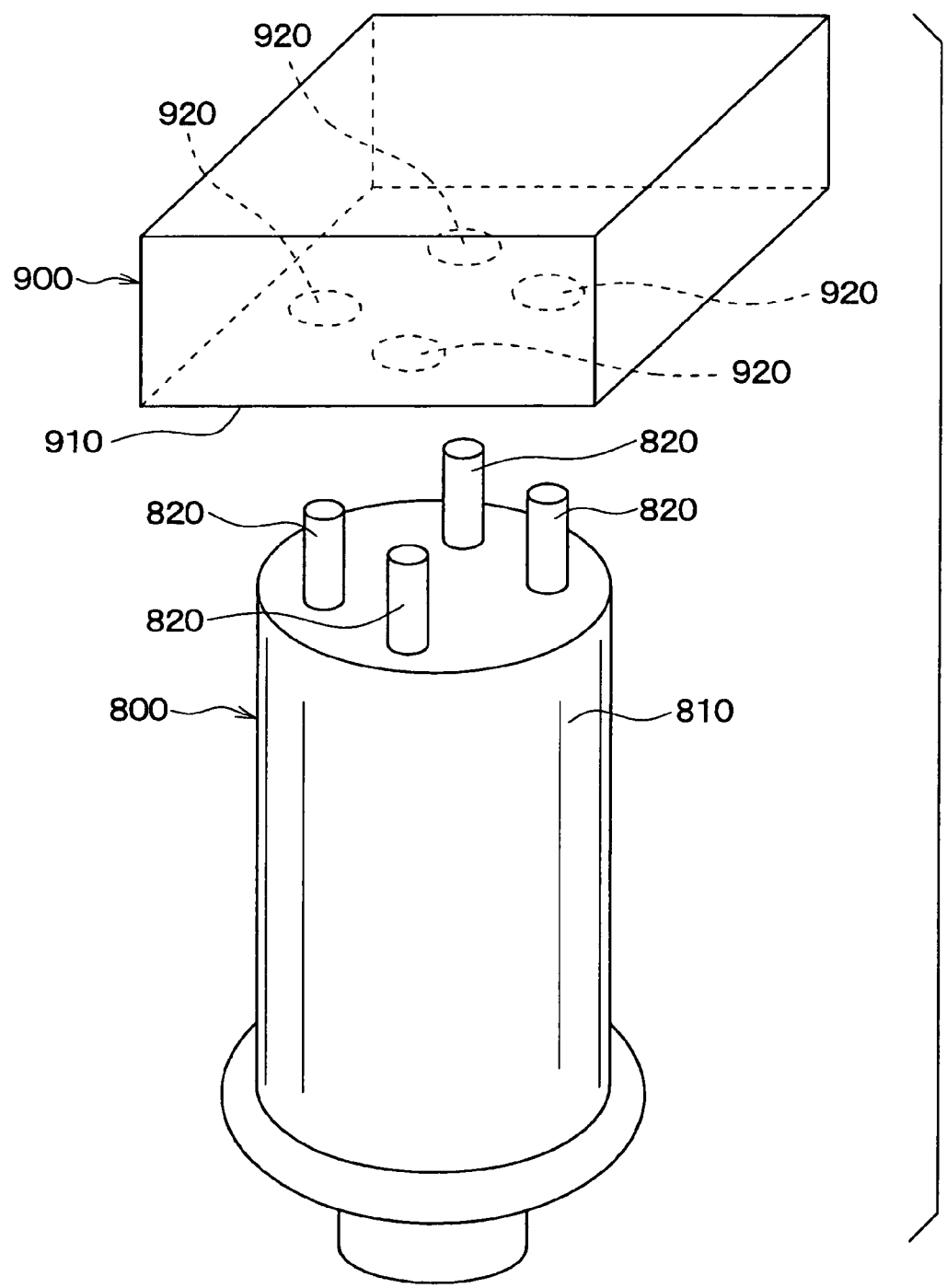
FIG. 7 is a perspective view showing a conventional sensor appliance and attachment component.
Figure 8:
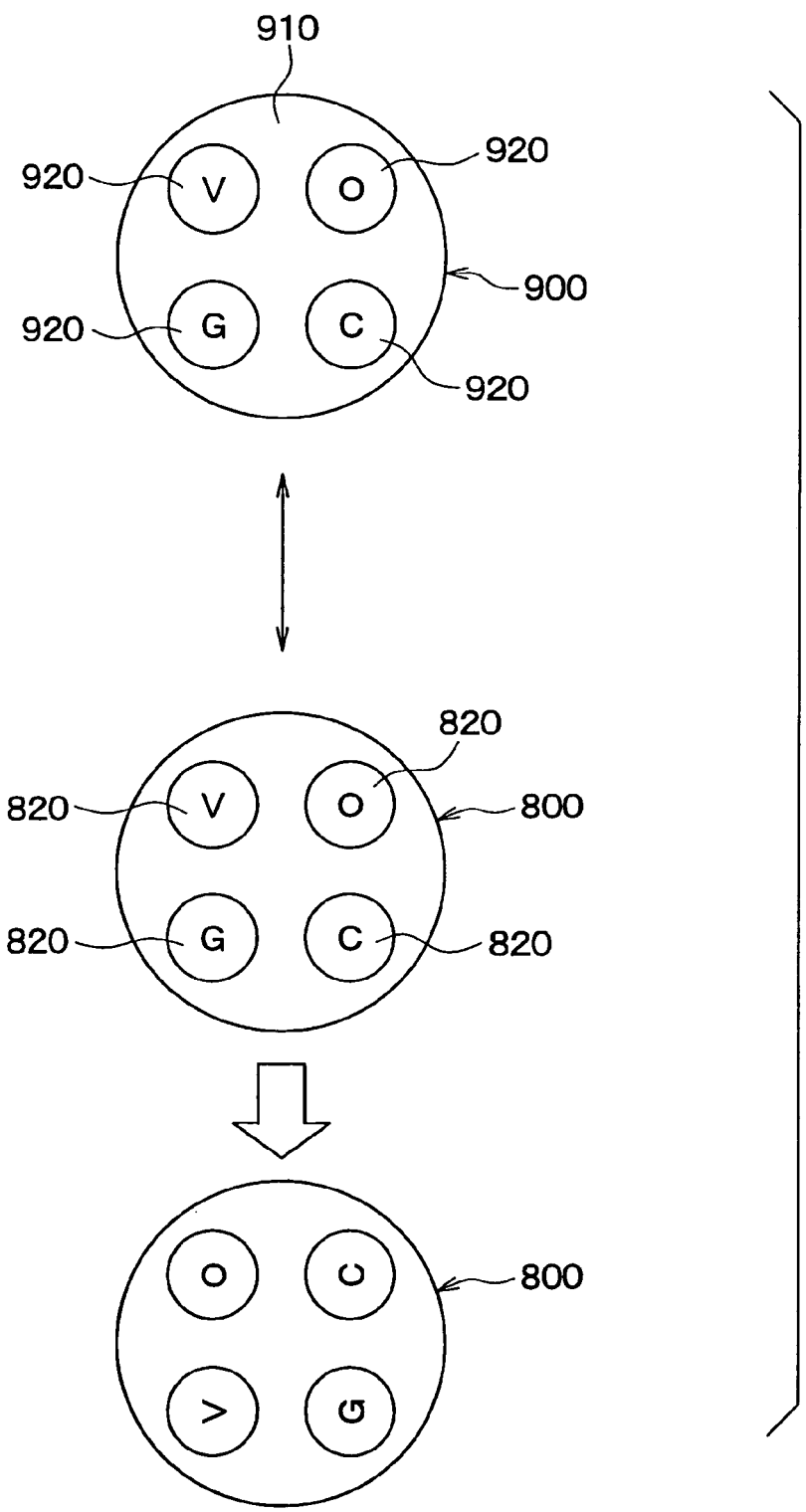
FIG. 8 is a plan view showing various contact states of the conventional sensor appliance and attachment component shown in FIG. 7.

FIG. 6 depicts a third embodiment of the present invention, wherein all the terminals 30 have different lengths. It should be appreciated that such a configuration provides advantages the same as those described above in accordance with the first and second embodiments of the present invention.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A contact structure for electrically connecting a spring-loaded connector array and a pad array, the spring-loaded connector array having a plurality of spring-loaded connectors arranged symmetrically with respect to a center axis of the spring-loaded connector array and in parallel with each other and the pad array having a plurality of pads arranged symmetrically with respect to a center axis of the pad array so as to be aligned with the plurality of spring-loaded connectors in a plurality of orientations relative to the spring-loaded connector array, wherein:

a tip of a first connector of the plurality of spring-loaded connectors has an initial position that is axially offset from an initial position of a tip of a second connector of the plurality of spring-loaded connectors;

a firs pad of the plurality of pads that is arranged to come in contact with the first connector is axially offset from a second pad of the plurality of spring-loaded pads; and the first connector, the second connector, the first pad, and the second pad are arranged so that in only one of the plurality of orientations will all of the plurality of connectors come in contact with a corresponding adjacent pad selected from the plurality of pads.

2. The contact structure according to claim 1, wherein:

the initial position of the tip of the first connector is ahead of the initial position of the tip of the second connector; and the pad array has a contact surface locating the second pad thereon and a concavity having a bottom surface locating the first pad thereon.

3. The contact structure according to claim 1, wherein:

the initial position of the tip of the first connector is behind the initial position of the second connector; and the pad array has a contact surface locating the second pad thereon and a projection having a top surface locating the first pad thereon.

4. The contact structure according to claim 1, wherein the first connector has an axial dimension that is larger tan an axial dimension of a remainder of the plurality of connectors.

5. The contact structure according to claim 1, wherein the first connector has an axial dimension that is smaller than an axial dimension of a remainder of the plurality of connectors.

6. The contact structure according to claim 1, wherein the first connector has an axial dimension that is larger than an axial dimension of the second connector and smaller than an axial dimension of a third connector of the plurality of connectors.

7. The contact structure according to claim 1, wherein each of the plurality of spring-loaded connectors has:

a fixed piece fixed on a body of the spring-loaded connector array;

a moving piece movable relative to the fixed piece in a longitudinal direction thereof; and a spring elastically connecting the fixed piece and the moving piece.

8. The contact structure according to claim 7, wherein a traveling stroke of the moving piece is shorter than a dimension of the offset between the initial position of the tip of the first connector and the initial position of the tip of the second connector in an axial direction of the plurality of spring-loaded connectors.

9. An electronic appliance comprising:

a spring-loaded connector array having a plurality of spring-loaded connectors ranged in parallel so that every one of the spring-loaded connectors comes to a starting location of another one of the spring-loaded connectors when the spring-loaded connector array is rotated about an axis by a predetermined angle, wherein;

a tip of a first connector of to plurality of spring-loaded connectors has an initial position that is axially offset from an initial position of a tip of a second connector of the plurality of spring-loaded connectors; and the first connector and the second connector are arranged so that the first connector comes to the starting location of the second connector when the spring-loaded connector array is rotated about the axis by the predetermined angle.

10. The electronic appliance according to claim 9, wherein the initial position of the tip of the first connector is ahead of the initial position of the tip of the second connector.

11. The electronic appliance according to claim 9, wherein the initial position of the tip of the first connector is behind the initial position of the tip of the second connector.

12. The electronic appliance according to claim 9, further comprising a pressure-sensing device and wherein at least one of the plurality of spring-loaded connectors is for outputting detecting signals of the pressure-sensing device.

13. The contact structure according to claim 9, wherein the first connector has an axial dimension that is larger than an axial dimension of a remainder of the plurality of connectors.

14. The contact structure according to claim 9, wherein the first connector has an axial dimension that is smaller than an axial dimension of a remainder of the plurality of connectors.

15. The contact structure according to claim 9, wherein the first connector has an axial dimension that is larger than an axial dimension of the second connector and smaller than an axial dimension of a third connector of the plurality of connectors.

16. The electronic appliance according to claim 9, wherein each of the plurality of spring-loaded connectors has:

a fixed piece fixed on a body of the spring-loaded connector array;

a moving piece movable relative to the fixed piece in a longitudinal direction thereof; and a spring elastically connecting the fixed piece and the moving piece.

17. The electronic appliance according to claim 16, wherein a traveling stroke of the moving piece is shorter than a dimension of the offset between the initial position of the tip of the first connector and the initial position of the tip of the second connector in an axial direction of the plurality of spring-loaded connectors.

18. A contact structure for electrically connecting a primary contact array with a secondary contact array, the primary contact array having a plurality of primary contacts that are symmetrically arranged with respect to a center axis of the primary contact array, and the secondary contact array having a plurality of secondary contacts that are symmetrically arranged with respect to a center axis of the secondary contact array so as to be aligned with the plurality of primary contacts in a plurality of orientations relative to the primary contact array, wherein:

a first primary contact of the plurality of primary contacts is axially offset from a second primary contact of the plurality of primary contacts;

a first secondary contact of the plurality of secondary contacts that is arranged to come in contact with the first primary contact is axially offset from a second secondary contact of the plurality of secondary contacts that is arranged to come in contact with the second primary contact;

the first primary contact, the fast secondary contact, the second primary contact and the second secondary contact are arranged so that in only one of the plurality of orientations will all of the plurality of primary contacts come in contact with a corresponding adjacent one of the plurality of secondary contacts; and at least one of the plurality of primary contacts and the plurality of secondary contacts that are aligned with each other in the one of the plurality of orientations is a spring-loaded connector.

* * * * *